May 1, 1956 G. W. CALHOUN 2,743,683
BEDROOM ACCOMMODATIONS FOR PASSENGER VEHICLES
Filed April 19, 1952 3 Sheets-Sheet 1
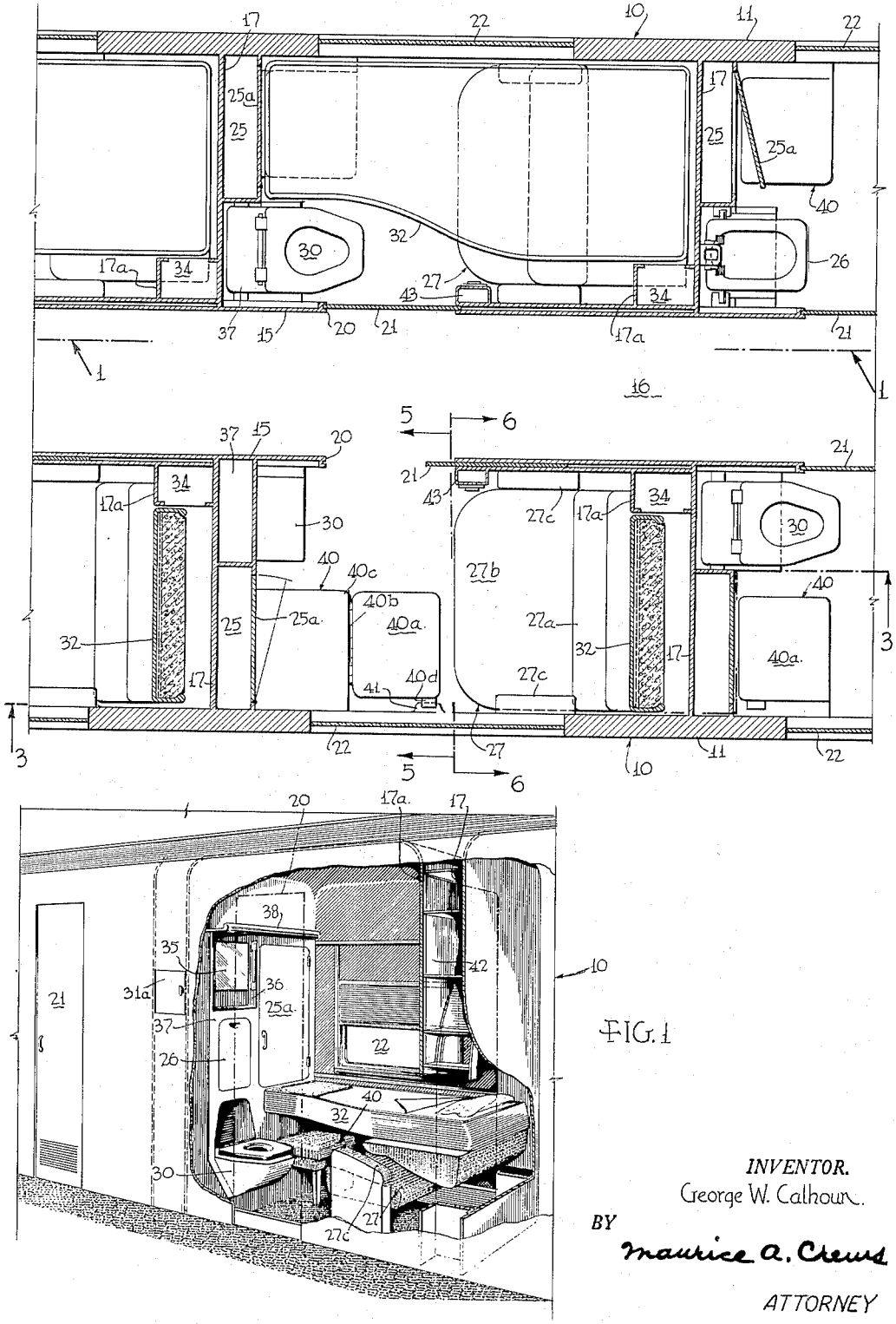
INVENTOR.
George W. Calhoun
BY
Maurice A. Crews
ATTORNEY May 1, 1956 G. W. CALHOUN 2,743,683
BEDROOM ACCOMMODATIONS FOR PASSENGER VEHICLES
Filed April 19, 1952 3 Sheets-Sheet 3
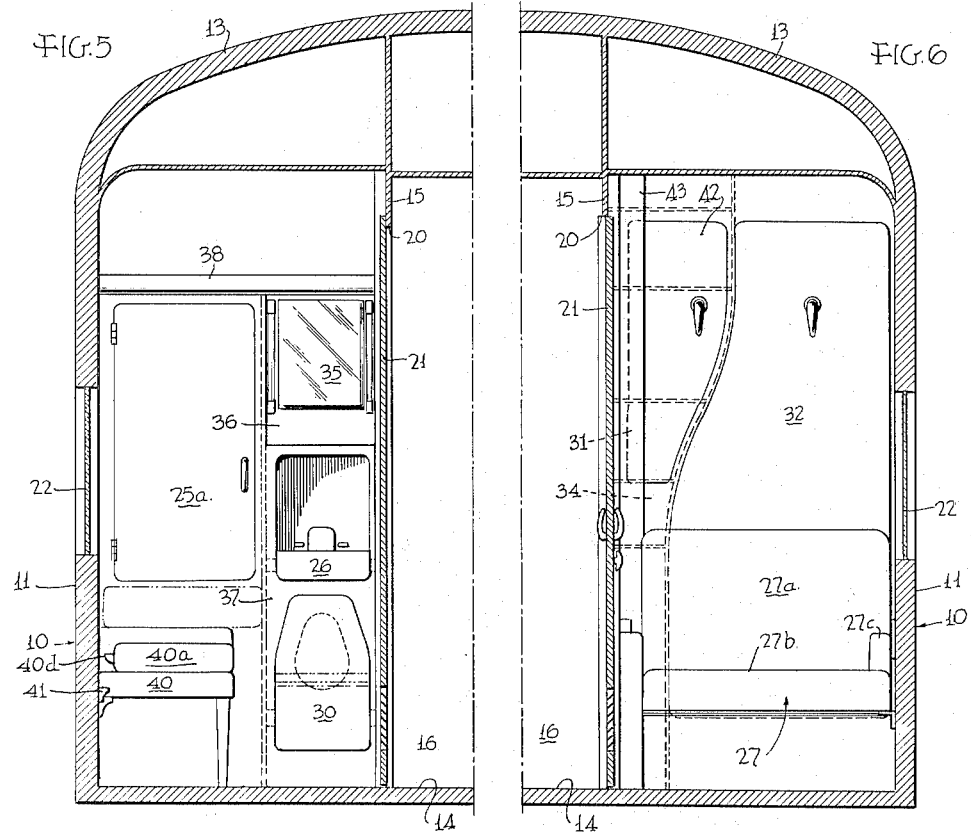
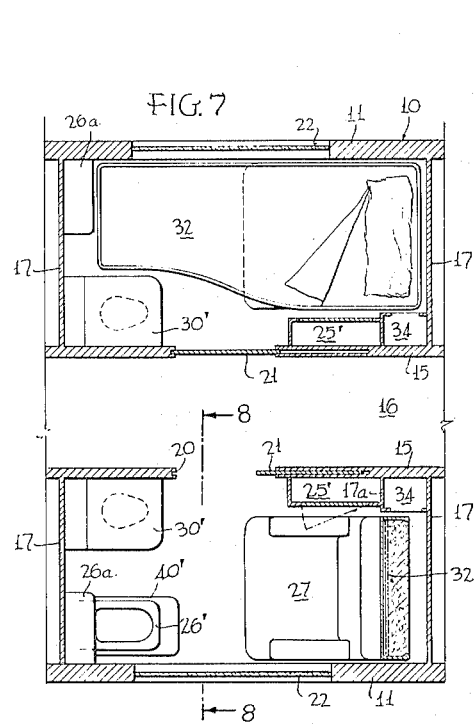
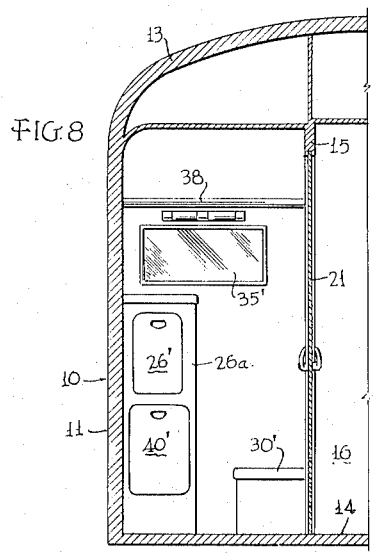
INVENTOR.
George W. Calhoun
BY
Maurice A. Creurd
ATTORNEY

United States Patent Office 2,743,683
Patented May 1, 1956

2,743,683

BEDROOM ACCOMMODATIONS FOR PASSENGER VEHICLES

George W. Calhoun, Havertown, Pa., assignor to The Budd Company, Philadelphia, Pa., a corporation of Pennsylvania Application April 19, 1952, Serial No. 283,184

12 Claims. (Cl. 105—315)

This invention relates to bedroom accommodations for passenger vehicles, especially for railway sleeping cars, and has for an object the provision of improvements in this art.

One of the particular objects of the invention is to provide a sleeping compartment having a rigid foldable bed or berth, a toilet, wash basin, clothes closet or wardrobe and drinking water facilities which are accessible at all times without moving the bed, and which are so arranged as to provide maximum convenience, the greatest possible space for moving around, and the appearance of roominess. There is also provided a wide comfortable seat for use when the bed is stowed.

Another object is to provide, in a room or compartment which is approximately the length of the bed or slightly longer, a utility compartment at one end of the bed which is useable both when the bed is down in the use position and when it is raised in the stowed position. Provision is also made for a shoe locker which is accessible from the room and from the aisle at all times.

Another object is to provide a toilet at one side of the entrance door of the compartment which leaves the greatest possible clear space alongside the bed in front of the toilet at the doorway.

Another object is to provide a compartment which has comfortable seating accommodations for the greatest possible number of people whereby the single occupant for which the space is basically intended may receive visitors for conferences or card games without crowding.

Another object is to provide a comfortable leg rest for the occupant, the leg rest being so made and disposed as to form a seat at times.

Another object in one form of the invention is to provide a principal seat which is the full width of the room, while still providing accessible toilet, basin, and wardrobe accommodations.

The above and other objects of the invention will be apparent from the following description of certain exemplary embodiments, reference being made to the accompanying drawings, wherein:

Fig. 1 is a vertical perspective view of a compartment of a railway sleeping car embodying the invention, the view being taken from line 1—1 of Fig. 2 and the aisle wall being cut away to show parts inside the compartment;

Fig. 2 is a sectional plan view of a portion of a railway bedroom car embodying the invention, the bed being shown down in the use position on one side of a center aisle and in a raised stowed position on the other side of the aisle;

Fig. 5 is a transverse elevation and section taken on the line 5—5 of Fig. 2;

Fig. 6 is a transverse elevation and section taken on the line 6—6 of Fig. 2;

Fig. 7 is a smaller scale section and plan, similar to Fig. 1, showing a modification; and Fig. 8 is a transverse vertical section taken on the line 8—8 of Fig. 7.

Figure 3:
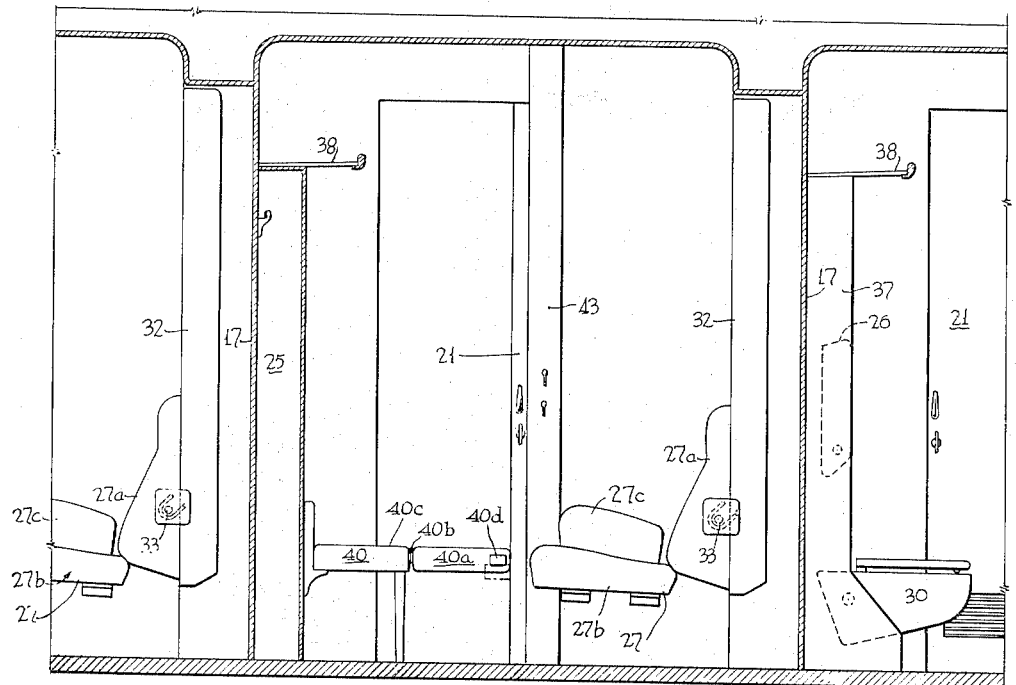
Fig. 3 is a longitudinal elevation and section taken on the line 3—3 of Fig. 2.

The present invention is an improvement upon the type of sleeping compartment accommodations disclosed in Patent No. 2,546,134, March 20, 1951. In that arrangement a rigid foldable bed occupies most of the area of the room and is cut out on one side to provide standing space at the doorway for operating the bed with the door closed; but it does not provide access to the toilet when the bed is down in the use position.

The accommodation with which the present invention deals is that in which at least eighteen sleeping compartments are arranged in a standard 85 ft. car, along with a porter's room and baggage space. It is possible to provide as many as 22 useable compartments of this general type on such a car by making the partitions thin and by having a bed take up the entire length of each compartment, the bed being about 73" long. According to the present invention, the room length is increased slightly and it is possible to have 20 compartments in a car, 10 on each side, and these compartments can be about 84" long. The beds still approximately take up the length of the compartment, in that they leave no sitting room and no standing room at either end of the bed; and yet they provide closet space at the end of the bed for useful facilities, such as a wardrobe or wash basin appurtenances, which can be used while the bed is down in the use position.

A 73" bed is satisfactory for average length persons and is used when the compartment is only about 73" long. In the present arrangement, where the room is longer, the bed can be about 74" or 75" long to provide a greater range of accommodation and greater comfort.

Where the compartments are arranged on each side of a center aisle of a railway sleeping car, they have a width of about 43". The normal head-end width of a berth is about 33" and, for comfort, the berth should be kept full width down to a point below the hips, about 30" from the top. It has been found that if the bed is narrowed at the bottom for the legs, say down to 24", this does not cause noticeable discomfort. The bottom of the bed frame is now commonly about 20" from the floor but it may be higher if desired, there being some latitude for height variation before encroaching on the window space. The bed frame is about 6" deep. The entrance doorway is about 18" in the clear. A toilet is about 16" high from the floor. A fixed toilet with no projecting fixtures thereabove extends about 22" from the back wall to the front edge. A foldable toilet with a foldable wash basin thereabove extends about 15" from the back wall when folded and about 26" when opened.

In the first embodiment illustrated, Figs. 1 to 6, a car 10 having outer side walls 11, a roof 13, and a floor 14, is provided with longitudinally extending rooms on each side of the walls 15 of the center aisle 16. Each room is like every other room and all transverse partition walls 17 are plane walls, free from jogs and the like. In Fig. 1 there is shown one full room and portions of two adjacent rooms on each side of the center aisle 16.

The rooms shown in the upper part of Fig. 2 are arranged for sleeping occupancy, with the beds down, and the rooms shown at the bottom of Fig. 2 are arranged for day use with the beds folded up in stowed position. A doorway 20 in the aisle wall is provided with a sliding door 21. In the present arrangement this doorway is located near the center of the length of the room. There is a window 22 in the outer wall, the sill of the window preferably being above the bottom of the bed when the bed is down. As shown in Fig. 1, the specific arrangement illustrated provides space between the top of the bed frame and the window sill.

Within the room there is provided a clothes closet or wardrobe 25 having a door 25a in the side, a folding wash basin 26, and a seat 27 having a back 27a which folds down, a bottom cushion 27b, and arms 27c. A toilet 30 is located at one side of the doorway, its piping and other service appurtenances being located near the transverse wall behind it.

The wardrobe 25 is here located at the foot of the bed and its door 25a is located at an elevation above the top of the bed, when down for use, so the wardrobe may be used at all times, whether the bed is stowed or down.

Behind the seat there is turnably mounted a rigid bed frame 32 which is movable, as about hinge pins 33, between a stowed vertical position at the transverse wall and a horizontal use position. Suitable means, not shown, are provided for supporting the lower end of the bed when it is down and for latching it in the lowered and stowed positions as well as in a position near the fully closed stowed position.

The bed frame is recessed or cut away on the side adjacent the door for a width to allow seat space on the toilet, and the recess extends up far enough from the bottom end to provide knee room in front of the toilet and standing room in front of the toilet for raising and lowering the bed and for opening and closing the door. The bed is located at such height as to comfortably provide knee and leg space beneath the rounded edge of the bed.

The bed at its upper end is of a width to occupy most of the width of the room between the outer wall 11 and the aisle wall 15 but there is here shown a small alcove or cabinet 34 which is accessible above bed-top height when the bed is down and which has shelf or pocket storage space for various small items. A night lamp, or other accessory may also be housed here. Thereabove, a built-in shoe locker 31, accessible from the room and aisle, is provided. A porter's access door 31a opening on the aisle is shown in Fig. 1.

The bed continues full width from the head end down for the full length from head to hip of the occupant, and then narrows gradually, and preferably in a smooth curvature, to the narrowed lower end portion. This lower end still provides a substantial width (24" or more) for comfort for the legs and feet. The narrow lower end portion extends up approximately to a point which is even with or forward of the front edge of the toilet. The bed is approximately the full length of the room, that is, it occupies substantially the full usable length of the room in that there is left no standing or sitting room for an occupant at either end of the bed.

There may be a recess for a mirror 35 and drinking water facilities or a utility cabinet above the basin and also a shelf recess 36, as shown in Figs. 1 and 5. The folding toilet 30, the folding wash basin 26, and the shelf and mirror recess may all be made up together as a single unit in a cabinet-like casing 37.

A shelf or luggage rack 38 is provided in the upper part of the room above the wardrobe 25 and fixture cabinet 37.

Figure 4:
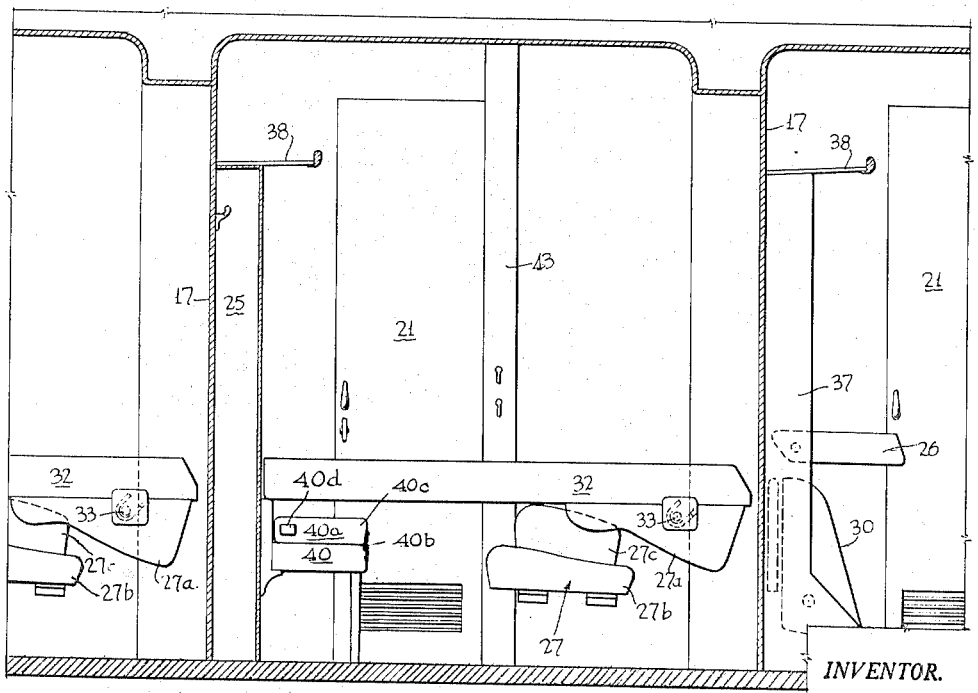
Fig. 4 is a longitudinal elevation and section like Fig. 3 but showing the beds down in use position.

A combination seat and leg rest 40 is provided in the outboard corner of the room adjacent the toilet, a leg rest 40a being hinged at 40b to a seat base 40c so as to swing forward in front of the seat 27b, as shown in Fig. 3, or to swing back over the base 40c, as shown in Fig. 4 and the lower portion of Fig. 1. The seat base 40c and the leg rest 40a are upholstered to provide comfort and good appearance in any position. The leg rest 40a when folded up is comfortable for sitting. The leg rest 40a may be provided with a projection 40d on the side to cooperate with a projection 41 on the outer side wall to support it when being used as a legt rest.

If desired, a supplemental full cover, fully upholstered may be provided for the toilet to provide another seat. This cover is not shown, but it may either be provided as a permanent element of common type in the toilet assembly made to fold down from the bottom of the toilet when closed, or it may be a removable element carried in a convenient storage space in the room, as in the bottom of the wardrobe or under seat 27.

As shown in Figs. 2 and 6, the bed is provided with a close fitting recess in a supplemental finishing wall 17a. There is considerable space between the walls 17 and 17a and where the bed is cut away on the side there is left considerable space which may be used for various purposes. For example, it may constitute a supplemental closet such as a wardrobe closed by a door 42 and may be provided with shelves forming subcompartments, one of which, 31, may open to the aisle with the aisle door 31a to provide the shoe exchange box or locker referred to above.

A column 43 alongside the door provides mounting space for switches and wiring appurtenant to the room at a location convenient to the occupant either when sitting or in bed and may also house a toilet paper receptacle in the lower portion.

The embodiment shown in Figs. 7 and 8 has most of the features of the first embodiment and, as far as applicable, the same reference characters are used. The principal differences are that the wardrobe 25' is placed alongside the seat and the seat narrowed as required; that the toilet 30' is a rigid fixture and provided with a fully upholstered cover seat; that the folding basin 26' is placed in a cabinet 26a at the foot of the bed; and that a seat and leg rest 40' is provided in the lower part of this cabinet. A mirror 35' may be larger than the one shown in the first embodiment. In both embodiments it will be understood that a dressing length mirror is provided on the inside of the aisle door.

In both embodiments it will be noted that the toilet is on the aisle side where the piping is more accessible and protected and where the discharge is near the center of the tracks clear of the space alongside the tracks. With this location of piping it is easy to provide a service door at the aisle to give access for repair without unduly disturbing the room occupant. The basin also is so located that its piping can be run in from behind the toilet near the aisle.

In the second embodiment the cabinet alongside the stowed bed will have its door size reduced because of the presence nearby of the wardrobe but its inside space and facilities may be about the same as before.

Instead of the fixed toilet and separate basin of the second embodiment, the combination unit of the first embodiment may be used, additional locker space being provided at the foot of the bed.

While certain embodiments of the invention have been disclosed for purposes of illustration, it is to be understood that there may be other embodiments within the general scope of the invention.

What is claimed is:

1. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side requiring standing or sitting knee space or both in front thereof, said toilet facing the long way in said room, a doorway in said aisle wall leading into said room forward of said toilet and near the center of length of the room, a door in said doorway, a rigid bed frame mounted in said room for movement between a stowed position and a horizontal use position, said bed being arranged in use with its longer dimension disposed in the direction of the length of the room, the bed also being of such length and width in relation to the length and width of the room that a side and an end thereof, if extended, would obstruct the space above said toilet, the side of said bed being cut away from one end for such distance along the side as to leave the vertical space above the toilet and the full width of the toilet for at least standing space distance in front thereof clear for use of the toilet and for manipulation of the bed, and a longitudinally thin enclosure, as for wardrobe or wash basin facilities, disposed on a wall at the bottom end of the bed, said enclosure, together with the bed, when down in the use position, taking substantially all of the length of the room between opposite transverse walls and the toilet being set back by the depth of the enclosure to provide additional space at the cut-out portion of the bed and to minimize the length of the cut-out in the bed.

2. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side requiring standing or sitting knee space or both in front thereof, said toilet facing the long way in said room, a doorway in said aisle wall leading into said room forward of said toilet and near the center of length of the room, a door in said doorway, a rigid bed frame mounted in said room for movement between a stowed position and a horizontal use position, said bed being arranged in use with its longer dimension disposed in the direction of the length of the room, the bed also being of such length and width in relation to the length and width of the room that a side and an end thereof, if extended, would obstruct the space above said toilet, the side of said bed being cut away from one end for such distance along the side as to leave the vertical space above the toilet and the full width of the toilet for at least standing space distance in front thereof clear for use of the toilet and for manipulation of the bed, and a longitudinally thin enclosure for one of the two facilities, namely a wardrobe and a foldable wash basin, at the foot end of the bed, said enclosure, together with the bed, when down in the use position, taking substantially all of the length of the room between opposite transverse walls and the toilet being set back by the depth of the enclosure to provide additional space at the cut-out portion of the bed and to minimize the length of the cut-out in the bed, the other of the said two facilities being disposed off the side of the bed having the cut-out.

3. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side requiring standing or sitting knee space or both in front thereof, said toilet facing the long way in said room, a doorway in said aisle wall leading into said room forward of said toilet and near the center of length of the room, a door in said doorway, a rigid bed frame mounted in said room for movement between a stowed position and a horizontal use position, said bed being arranged in use with its longer dimension disposed in the direction of the length of the room, the bed also being of such length and width in relation to the length and width of the room that a side and an end thereof, if extended, would obstruct the space above said toilet, the side of said bed being cut away from one end for such distance along the side as to leave the vertical space above the toilet and the full width of the toilet for at least standing space distance in front thereof clear for use of the toilet and for manipulation of the bed, and a longitudinally thin enclosure, comprising a wardrobe with a door opening above the top of the bed when down, at the foot end of the said enclosure, together with the bed, when down in the use position, taking substantially all of the length of the room between opposite transverse walls and the toilet being set back by the depth of the enclosure to provide additional space at the cut-out portion of the bed and to minimize the length of the cut-out in the bed.

4. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side requiring standing or sitting knee space or both in front thereof, said toilet facing the long way in said room, a doorway in said aisle wall leading into said room forward of of said toilet and near the center of length of the room, a door in said doorway, a rigid bed frame mounted in said room for movement between a stowed position and a horizontal use position, said bed being arranged in use with its longer dimension disposed in the direction of the length of the room, the bed also being of such length and width in relation to the length and width of the room that a side and an end thereof, if extended, would obstruct the space above said toilet, the side of said bed being cut away from one end for such distance along the side as to leave the vertical space above the toilet and the full width of the toilet for at least standing space distance in front thereof clear for use of the toilet and for manipulation of the bed, and a longitudinally thin enclosure, comprising a wash basin cabinet, at the foot end of the bed with a foldable wash basin accessible for use above the top of the bed when down, said enclosure, together with the bed, when down in the use position, taking substantially all of the length of the room between opposite transverse walls and the toilet being set back by the depth of the enclosure to provide additional space at the cut-out portion of the bed and to minimize the length of the cut-out in the bed.

5. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side requiring standing or sitting knee space or both in front thereof, said toilet facing the long way in said room, a doorway in said aisle wall leading into said room forward of said toilet and near the center of length of the room, a door in said doorway, a rigid bed frame mounted in said room for movement between a stowed position and a horizontal use position, said bed being arranged in use with its longer dimension disposed in the direction of the length of the room, the bed also being of such length and width in relation to the length and width of the room that a side and an end thereof, if extended, would obstruct the space above said toilet, the side of said bed being cut away from one end for such distance along the side as to leave the vertical space above the toilet and the full width of the toilet for at least standing space distance in front thereof clear for use of the toilet and for manipulation of the bed, a seat at the head end of the room approximately the full width of the room, a wardrobe at the foot end of the bed, said wardrobe, together with the bed, when down in the use position, taking substantially all of the length of the room between opposite transverse walls and the toilet being set back by the depth of the enclosure to provide additional space at the cut-out portion of the bed and to minimize the length of the cut-out in the bed.

6. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side, said toilet facing the long way in the room, a movable rigid bed in the room movable from a stowed position to a horizontal use position, said bed having a cut-out on one side from the foot end at the toilet to provide sitting space on the toilet and knee space of the same width for a distance in front of the toilet, a seat in the room at the head end of the bed, a cabinet as for a wardrobe or basin at the foot of the bed and having a part hinged for use when the bed is down, said cabinet, together with the bed, when down in the use position, taking substantially all of the length of the room between opposite transverse walls and the toilet being set back by the depth of the enclosure to provide additional space at the cut-out portion of the bed and to minimize the length of the cut-out in the bed, a door for the room in the aisle wall forward of said toilet and near the center of length of the room, and an auxiliary seat mounted in the room at the same end as the toilet but on the opposite side which is useable when the bed is stowed.

7. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side, said toilet facing the long way in the room, a movable rigid bed in the room movable from a stowed position to a horizontal use position, said bed having a cut-out on one side from the foot end at the toilet to provide sitting space on the toilet and knee space of the same width for a distance in front of the toilet, a seat in the room at the head end of the bed, a cabinet as for a wardrobe or basin at the foot of the bed and having a part hinged for use when the bed is down, said cabinet, together with the bed, when down in the use position, taking substantially all of the length of the room between opposite transverse walls and the toilet being set back by the depth of the enclosure to provide additional space at the cut-out portion of the bed and to minimize the length of the cut-out in the bed, a door for the room in the aisle wall forward of said toilet and near the center of length of the room, and an auxiliary seat mounted in the room at the same end as the toilet but on the opposite side which is useable when the bed is stowed, said auxiliary seat having a hinged cover movable toward the first said seat to form a leg rest.

8. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side, said toilet facing the long way in the room, a movable rigid bed in the room movable from a stowed position to a horizontal use position, said bed having a cut-out on one side from the foot end at the toilet to provide sitting space on the toilet and knee space of the same width for a distance in front of the toilet, a seat in the room at the head end of the bed, a cabinet as for a wardrobe or basin at the foot of the bed and having a part hinged for use when the bed is down, said cabinet, together with the bed, when down in the use position, taking substantially all of the length of the room between opposite transverse walls and the toilet being set back by the depth of the enclosure to provide additional space at the cut-out portion of the bed and to minimize the length of the cut-out in the bed, a door for the room in the aisle wall forward of said toilet and near the center of length of the room, and an auxiliary seat mounted in the room at the same end as the toilet but on the opposite side which is useable when the bed is stowed, said auxiliary seat being foldable into said cabinet at the foot of the bed.

9. The combination as set forth in claim 6, which further includes a foldable leg rest in front of the first said seat at the outer wall side.

10. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side requiring standing or sitting knee space or both in front thereof, said toilet facing the long way in said room, a doorway in said aisle wall leading into said room forward of said toilet and near the center of length of the room, a door in said doorway, a rigid bed frame mounted in said room for movement between a stowed position and a horizontal use position, said bed being arranged in use with its longer dimension disposed in the direction of the length of the room, the bed also being of such length and width in relation to the length and width of the room that a side and an end thereof, if extended, would obstruct the space above said toilet, the side of said bed being cut away from one end for such distance along the side as to leave the vertical space above the toilet and the full width of the toilet for at least standing space distance in front thereof clear for use of the toilet and for manipulation of the bed, a longitudinally thin enclosure, as for wardrobe or wash basin facilities, disposed on a wall at the bottom end of the bed, said enclosure, together with the bed, when down in the use position, taking substantially all of the length of the room between opposite transverse walls and the toilet being set back by the depth of the enclosure to provide additional space at the cut-out portion of the bed and to minimize the length of the cut-out in the bed, said bed frame being hinged at the head end to fold up into a vertical stowed position leaving storage space alongside the cut-out portion on the side of the bed frame, and a door covering the storage space alongside the bed, said door having one edge conforming to the shape of the side of the bed frame along the cut-out portion.

11. The combination as set forth in claim 10, which further includes shelves in said storage space alongside the bed frame to form a plurality of convenience compartments, one of said convenience compartments having a porter's access door on the aisle side to constitute a shoe locker.

12. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of the room on the aisle side requiring standing or sitting knee space or both in front thereof, said toilet facing the long way in said room, a doorway in said aisle wall leading into said room forward of said toilet and near the center of length of the room, a door in said doorway, a rigid bed frame mounted in said room for movement between a stowed position and a horizontal use position, said bed being arranged in use with its longer dimension disposed in the direction of the length of the room, the bed also being of such length and width in relation to the length and width of the room that a side and an end thereof, if extended, would obstruct the space above said toilet, the side of said bed being cut away from one end for such distance along the side as to leave the vertical space above the toilet and the full width of the toilet for at least standing space distance in front thereof clear for use of the toilet and for manipulation of the bed, said bed frame being hinged at the head end to fold up into a vertical stowed position leaving storage space alongside the cut-out portion of the side of the bed frame, and a door covering the storage space alongside the bed, said door having one edge conforming to the shape of the side of the bed frame along the cut-out portion.

References Cited in the file of this patent

UNITED STATES PATENTS

| Number | Name | Date |
|---|---|---|
| 1,712,811 | Carry | May 14, 1929 |
| 2,143,827 | Demarest | Jan. 10, 1939 |
| 2,147,011 | Crawford | Feb. 14, 1939 |
| 2,309,665 | Parke | Feb. 2, 1943 |
| 2,546,129 | Mayer | Mar. 20, 1951 |
| 2,546,133 | Patton | Mar. 20, 1951 |
| 2,546,134 | Watter | Mar. 20, 1951 |
| 2,567,894 | Reinke et al. | Sept. 11, 1951 |
| 2,590,045 | Schiff | Mar. 18, 1952 |